3,684,649
RESIN-IMPREGNATED TISSUE OVERLAYS
Ray T. Shelton, Kelso, and Ellsworth O. Jensen, Longview, Wash., assignors to Weyerhaeuser Company, Tacoma, Wash.
No Drawing. Filed Nov. 27, 1970, Ser. No. 93,427
Int. Cl. B32b 27/04, 27/06, 27/30
U.S. Cl. 161—251                                  8 Claims

ABSTRACT OF THE DISCLOSURE

Disclosed herein is a resin-impregnated tissue useful for overlaying various woody substrates. The tissue is impregnated with an aqueous composition comprising an emulsified thermosetting acrylic resin and a solubilized thermoplastic acrylic resin.

BACKGROUND OF THE INVENTION

This invention relates to a method of producing a resin-impregnated tissue for overlaying various woody substances, to the impregnated tissue so produced, to a process of producing a laminate of the impregnated tissue and a woody substrate and to the laminate so produced.

In the art of manufacturing overlaid wood products, it is well known to utilize resin-impregnated tissues to render the surface of the wood product water and wear resistant and to improve its receptivity to the various finishes such as paints. Formation of the paper-wood product laminate is effected by applying the impregnated tissue to the wood product and hot-pressing the resulting assembly, typically in a die or between flat caul plates. Conventionally, the tissue is impregnated with a phenolic or melamine-urea resin. One disadvantage of phenolic resins is that they have a tendency to stick to and accumulate on the die or caul plate surfaces, necessitating costly and time consuming cleaning of the dies to remove the accumulated resin. Often such cleaning becomes necessary after only 12 to 16 hours of operation. Another disadvantage of phenolic resins is that the typical brown color which they possess when cured is difficult to mask by incorporation of pigments into the impregnating resin. The melamine-urea resins tend to yield impregnated papers which are too brittle to be used in the production of laminates having sharp-contours.

SUMMARY OF THE INVENTION

It has now been discovered that flexible overlays which do not present the resin accumulation problem associated with the use of phenolic resins can be produced by impregnating tissue with an aqueous composition comprising an emulsified thermosetting acrylic resin and a solubilized thermoplastic acrylic resin. Because of their good flexibility, these impregnated tissues are especially useful in the production of contoured laminates.

This invention is thus directed to a tissue impregnated with a composition comprising a water-insoluble thermosetting acrylic resin and a thermoplastic acrylic resin capable of being water-solubilized.

This invention is also directed to a method of producing an impregnated tissue comprising substantially saturating a tissue with an aqueous composition comprising an emulsified thermosetting acrylic resin and a solubilized thermoplastic acrylic resin and then drying said tissue.

This invention is further directed to a method of forming a rigid laminate comprising (1) applying to a woody substrate a tissue impregnated with a composition comprising a water-insoluble thermosetting acrylic resin and a thermoplastic acrylic resin capable of being water-solubilized and (2) hot-pressing the resultant assembly to effect consolidation thereof.

This invention is still further directed to a laminate comprising a superimposed assembly of (1) a rigid, woody substrate and (2) a tissue impregnated with a composition comprising a water-insoluble thermoset acrylic resin and a thermoplastic acrylic resin capable of being water-solubilized.

DETAILED DESCRIPTION OF THE INVENTION

The woody substrates used in this invention can include, for example, lumber, plywood, and various types of consolidated products manufactured from particulate wood such as those commonly known as "particleboard," "hardboard," "fiberboard" and "fiber-type particleboard." The particulate wood used in the manufacture of these products is typically in the form of chips, shavings, splinters, sawdust, fibers, mixture thereof, and the like.

This invention is particularly useful in the production of overlaid fiberboards. These are conventionally prepared by pressing, under relatively mild pressure and temperature conditions, a loosely consolidated mat or felt of wood fibers and one or more resin binders to obtain a self-supporting panel. After being steamed to increase its plasticity and moisture content, the panel is overlaid with a resin-impregnated tissue. The resulting assembly is then hot-pressed between flat platens or matching contoured dies to consolidate the mat or felt, to bond the overlay thereto, and if contoured dies are employed, to mold the panel into the desired shape.

The paper tissues used in this invention typically have a basis weight of from 6 to 36 lbs. per ream (one "ream" being 3,000 sq. ft.). The preferred papers for use in this invention have a basis weight of from 12 to 21 lbs. per ream. It is preferred that these papers be lightly creped unidirectionally or bidirectionally, particularly when they are to be used in the manufacture of contoured laminates. The creping renders the paper more extensible and capable of greater elongation without tearing.

As indicated previously, the material with which the tissue paper is impregnated is an aqueous composition comprising an emulsified thermosetting acrylic resin and a solubilized thermoplastic acrylic resin. This unique combination of resins provides an impregnating composition which possesses several most desirable properties. Inclusion of the solubilized thermoplastic acrylic resin renders the compoition capable of completely saturating the tissue. This is important if optimum bonding within the tissue and optimum tissue-to-substrate bonding as the thermoplastic resin flows into intimate contact with the substrate during hot-pressing are to be obtained. The thermoplastic resin also serves to plasticize the more brittle thermosetting resin, an effect which is of particular importance in the production of contoured laminates. The thermosetting resin contributes to the non-stick characteristics mentioned previously and also contributes to the excellent surface hardness and durability of the laminates of this invention.

Typical of thermosetting acrylic resins which may be used in this invention are those disclosed in U.S. Pat. 3,033,811. These are acrylic polymers based on esters of acrylic or methacrylic acids modified with functional groups which provide a crosslinking mechanism.

Exemplary of the thermoplastic acrylic resins capable of being water-solubilized are acrylic polymers based on esters of acrylic or methacrylic acid modified with hydrophilic functional groups. Water-solubilization of these resins is ordinarily effected by the addition of ammonia or low molecular weight aliphatic amines to the aqueous system. The ratio of thermoplastic resin to thermosetting resin is ordinarily in the range of from 1:1 to 4:1 by weight solids. Harder surfaces, which may be subject to slight crazing during hot-pressing, are obtained using the 1:1 ratio, whereas the 4:1 ratio may result in slight sticking in the press during hot-pressing. Ratios in the range of from 3:1 to 3:2 are preferred.

Although the preferred method of applying these resins to the tissue involves immersing the tissue in an aqueous mixture of the two types of resins, acceptable results can be achieved by immersing the tissue in an aqueous solution of the thermoplastic acrylic resin, and thereafter applying an aqueous emulsion of the thermosetting acrylic resin, such as by dipping, spraying, curtain coating and the like. This two-step application technique is not preferred because the resulting high concentration of thermosetting resin on the surface of the tissue can result in a crazed surface on the hot-pressed laminate. Regardless of the method used, substantial saturation of the tissue by the thermoplastic resin is necessary to achieve a hot-pressed laminate of optimum quality.

The impregnated tissue should be at least partially dried prior to laminate formation in order to avoid blistering of the surface due to the formation of excess amounts of steam during the hot-pressing operation. Drying of the impregnated tissue is accomplished by standard techniques well known to those in the impregnated paper art. It will be apparent that only moderate temperatures should be used during the drying so as to avoid undue crosslinking of the thermosetting component.

Various extenders such as clays and calcium carbonate, pigments such as titanium dioxide, release agents such as oleic acid and stearic acid and antifoam agents, can be incorporated into the compositions used in this invention. Extenders serve to fill the pores in the tissue so that a smooth laminate surface is obtained, while pigments serve to render the overlay opaque and/or colored. By employing pigments and extenders such as those mentioned above, a finished laminate can be obtained which can be painted with good single coat coverage without there being any need to apply a conventional priming coat. The combined amount of pigments and extenders used in the impregnating composition usually does not exceed 50% by volume. Preferred amounts are from 25 to 35% by volume. Dispersants and wetting agents are usually incorporated in such pigmented compositions to prevent flocculation.

The following example is provided by way of illustration only and is not intended to be limiting of the invention in any way. All parts and percentages are by weight unless otherwise indicated.

EXAMPLE

A titanium dioxide dispersion is prepared by blending together 3000 parts water; 280 parts of Tamol 731 dispersant (a sodium salt of a carboxylated polyelectrolyte; Rohm and Haas Company); 35 parts of Nopco NXZ antifoam agent (Nopco Chemical Company); 70 parts of Triton CF-10 (an alkyl aryl ether wetting agent produced by Rhom and Haas Company; and 14,000 parts of titanium dioxide (Cyanamid OR-650; American Cyanamid Company). The first four ingredients are blended in a high shear mixer at 1000 r.p.m. for one minute. The titanium dioxide is slowly added as the speed is increased to 5000 r.p.m. The resulting blend is subjected to continued high shear until ground to 6-7 on the Hegman scale.

A clay dispersion is prepared by slowly adding 3000 parts of kaolin clay to 7000 parts of water while blending in a high shear mixer at 1500 r.p.m. The speed is then increased to and held at 4000 r.p.m. until the mixture is ground to 6-7 on the Hegman scale.

An oleic acid emulsion is prepared by mixing 60 parts by volume of Triton CF-10 wetting agent and 40 parts by volume of oleic acid in a Waring blender for 2 minutes.

An aqueous impregnating composition is prepared from 420 parts of Acrysol WS-24 (a thermoplastic acrylic copolymer dispersion resin supplied in water, having a solids content of 36% and a pH of 7.4; Rohm and Haas Company); 180 parts of Rhoplex AC-201 (a thermosetting, acrylic copolymer resin emulsion in water, having a solids content of 46% and a pH of 9.0 to 10.0; Rohm and Haas Company), 300 parts of the above titanium dioxide dispersion; 120 parts of the above clay dispersion; 12.0 parts of the above oleic acid emulsion and 4.0 parts of the Nopco NXZ antifoam agent. The resins and antifoam agent are blended in a high shear mixer operating at 1000 r.p.m. for one minute. The oleic acid emulsion is then added and while the mixer is operating at 1000 r.p.m. the clay and titanium dioxide dispersions are added. The speed is increased to 5000 r.p.m. and is held at that speed until a grind of 6-7 on the Hegman scale is achieved. The pH of the composition is adjusted to 9.5 to 9.8 with ammonium hydroxide to fully solubilize the thermoplastic resin, and to stabilize and increase the viscosity of the composition.

Sheets (42 x 90 inches) of lightly creped tissue paper having a basis weight of 17.1 lbs. per ream and a thickness of 4.8 mils caliper are drawn through a reservoir containing the impregnating composition prepared as described above. Excess impregnating composition is removed from the surface of the sheets, the resulting wet sheets containing 20 to 22 lbs. of impregnating composition per 1000 sq. ft. The sheets are dried overnight at ambient temperatures.

A moldable fiberboard panel, produced as described in U.S. Patent 3,320,287, containing about 1% of a phenol-formaldehyde resole type resin and about 10% of a modified wood rosin, is steamed to a moisture content of 8% as described in U.S. Pat. 3,176,409. Immediately after this steaming, a single impregnated sheet is applied to the panel, and the resulting assembly is subjected to hot-pressing in matching metal dies at a temperature of 350° F. and pressure of 350 to 400 p.s.i. for approximately 90 seconds The resulting laminate is securely bonded and possesses a smooth, uniform, white surface which exhibits excellent paint receptivity. Excellent finishing of the laminate is obtained by application of a single coat of a commercial paint. No appreciable resin accumulation on the dies is detected even after days of continuous hot-pressing.

What is claimed is:

1. A method of forming a rigid laminate comprising (1) applying to a woody substrate a tissue impregnated with a composition comprising a water-insoluble thermosetting acrylic resin and a thermoplastic acrylic resin capable of being water-solubilized and (2) hot-pressing the resultant assembly to effect consolidation thereof.

2. The method of claim 1 wherein said substrate is a moldable wood fiber panel.

3. The method of claim 1 wherein said substrate is moldable and wherein hot-pressing is effected between matching contoured dies.

4. The method of claim 1 wherein said tissue is creped.

5. The method of claim 1 wherein said composition contains a pigment.

6. A rigid consolidated, hot-pressed laminate comprising a superimposed assembly of (1) a rigid woody substrate and (2) a tissue impregnated with a composition comprising a water-insoluble thermoset acrylic resin and a thermoplastic acrylic resin capable of being water-solubilized.

7. The laminate of claim 6 wherein said substrate is a fiberboard panel.

8. The laminate of claim 6 wherein said composition contains a pigment.

References Cited

UNITED STATES PATENTS

| | | | |
|---|---|---|---|
| 2,922,732 | 1/1960 | Hopkins et al. | 161—251 X |
| 3,004,868 | 10/1961 | Sumner et al. | 117—155 X |
| 3,220,916 | 11/1965 | Petropoulos | 161—413 X |
| 3,235,443 | 2/1966 | Greenman et al. | 117—155 X |

WILLIAM A. POWELL, Primary Examiner

U.S. Cl. X.R.

117—155; 156—242; 161—128; 264—135